United States Patent
Wen

(12) United States Patent (10) Patent No.: US 7,847,975 B2
Wen (45) Date of Patent: Dec. 7, 2010

(54) CONVERTING BLACK TO COMPOSITE BLACK IN DIGITAL PRINTING

(75) Inventor: Zhenhuan Wen, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 776 days.

(21) Appl. No.: 11/824,689

(22) Filed: Jul. 2, 2007

(65) Prior Publication Data
US 2009/0009778 A1    Jan. 8, 2009

(51) Int. Cl.
*G06F 15/00* (2006.01)

(52) U.S. Cl. .................. 358/1.9; 358/518; 358/523; 358/529

(58) Field of Classification Search .................. 358/1.1, 358/1.9, 3.23, 500, 501, 518, 523, 529
See application file for complete search history.

(56) References Cited

U.S. PATENT DOCUMENTS

| | | | | |
|---|---|---|---|---|
| 4,590,515 | A * | 5/1986 | Wellendorf | 358/500 |
| 5,181,068 | A * | 1/1993 | Morikawa | 355/77 |
| 5,386,305 | A * | 1/1995 | Usami | 358/518 |
| 5,528,386 | A * | 6/1996 | Rolleston et al. | 358/522 |
| 5,710,824 | A * | 1/1998 | Mongeon | 382/162 |
| 7,064,860 | B1 * | 6/2006 | Balasubramanian et al. | 358/1.9 |
| 2004/0042019 | A1 * | 3/2004 | Moro | 358/1.9 |

* cited by examiner

*Primary Examiner*—Thomas D Lee
(74) *Attorney, Agent, or Firm*—Fay Sharpe LLP

(57) ABSTRACT

A method of converting black to composite/process black in a digital color print engine. A lightness adjustment is employed for converting input image $(O, O, O, K_{in})$ to $K_o$ and initial values of $C_o, M_o, Y_o$ are set equal to $K_o$ and then converted to $C_1, M_1, Y_1, K_1$ by GCR strategy. Values of $C_{out}, M_{out}, Y_{out}, K_{out}$ are determined by Gray Balance Adjustment for values of $C_1, M_1, Y_1, K_1$ and inputted to the color print engine. The user may disable the conversion to composite black and print black ink/tones if desired. The user may also input different parameters for Lightness Adjustment, Gray Component Replacement and Gray Balance Adjustment.

8 Claims, 4 Drawing Sheets

CONVERTING BLACK TO COMPOSITE BLACK IN DIGITAL PRINTING

BACKGROUND

The present disclosure relates to digital printing in black where it is desired to have a high quality, finished print. Heretofore, digital printing with black ink, for example, with inkjet printers employing frequency modulation type ink-dot spacing have encountered graininess due to ink-dot misplacement. Where dense pure black printing is required for the quality of the print job, it has been desired to improve the quality of the black printing without the increased cost of providing a print engine with a higher number of dots-per-inch of ink deposition. The same problems of graininess have also been encountered where black ink is deposited to provide gray tones/tints.

Thus, it has been desired to provide a way or means of improving the tone of black printing in digital print engines.

BRIEF DESCRIPTION

The present disclosure describes a method or process of converting digital printing in black to a composite of color printing to form a composite black in a manner which eliminates the graininess which may be encountered in digital printing with pure black ink/toner. The method of the present disclosure converts the coordinates of black in color space, i.e. 0, 0, 0, $K_{in}$ to coordinates $C_0$, $M_0$, $Y_0$ in the Cyan, Magenta, Yellow, color space, and then performs a gray component replacement, GCR, to provide specific coordinates $C_1$, $M_1$, $Y_1$, $K_1$. This is followed by a Gray Balance Adjustment to provide coordinates $C_{out}$, $M_{out}$, $Y_{out}$, $K_{out}$ and inputting these color space coordinates into a digital print engine for creating a composite, or process, black on the print media. Provision is made to adjust the conversion to CMYK color space in accordance with user specified parameters. Provision is also made for user inputting different parameters for any one of the Lightness adjustment, GCR strategy or Gray Balance Adjustment based upon any of several different criteria such as marking resolution, color mode or service type. Provision is also made for the user disabling the composite conversion and direct printing of black ink or toner in the print engine.

DETAILED DESCRIPTION

Figure 1:
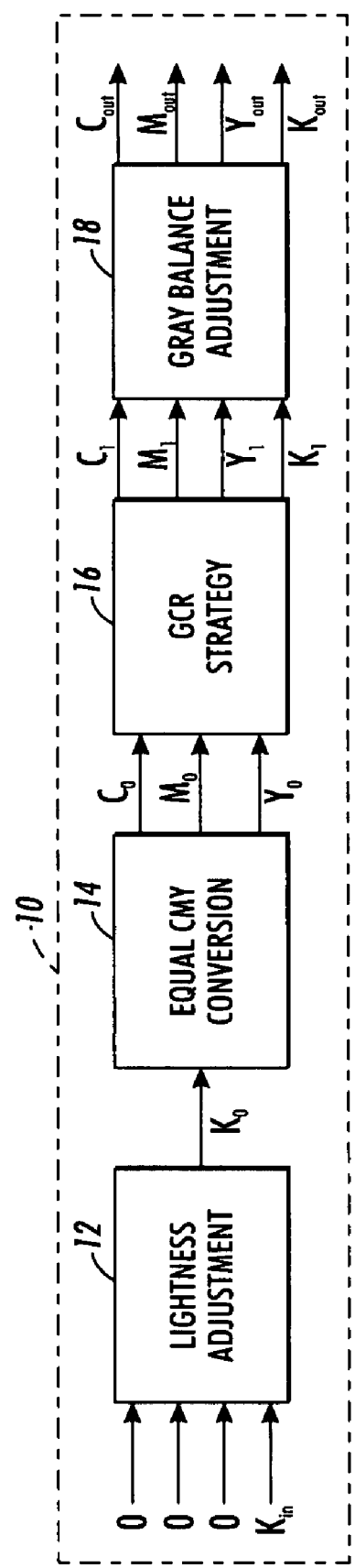
FIG. 1 is a block flow diagram of the method of the present disclosure.
Figure 2:
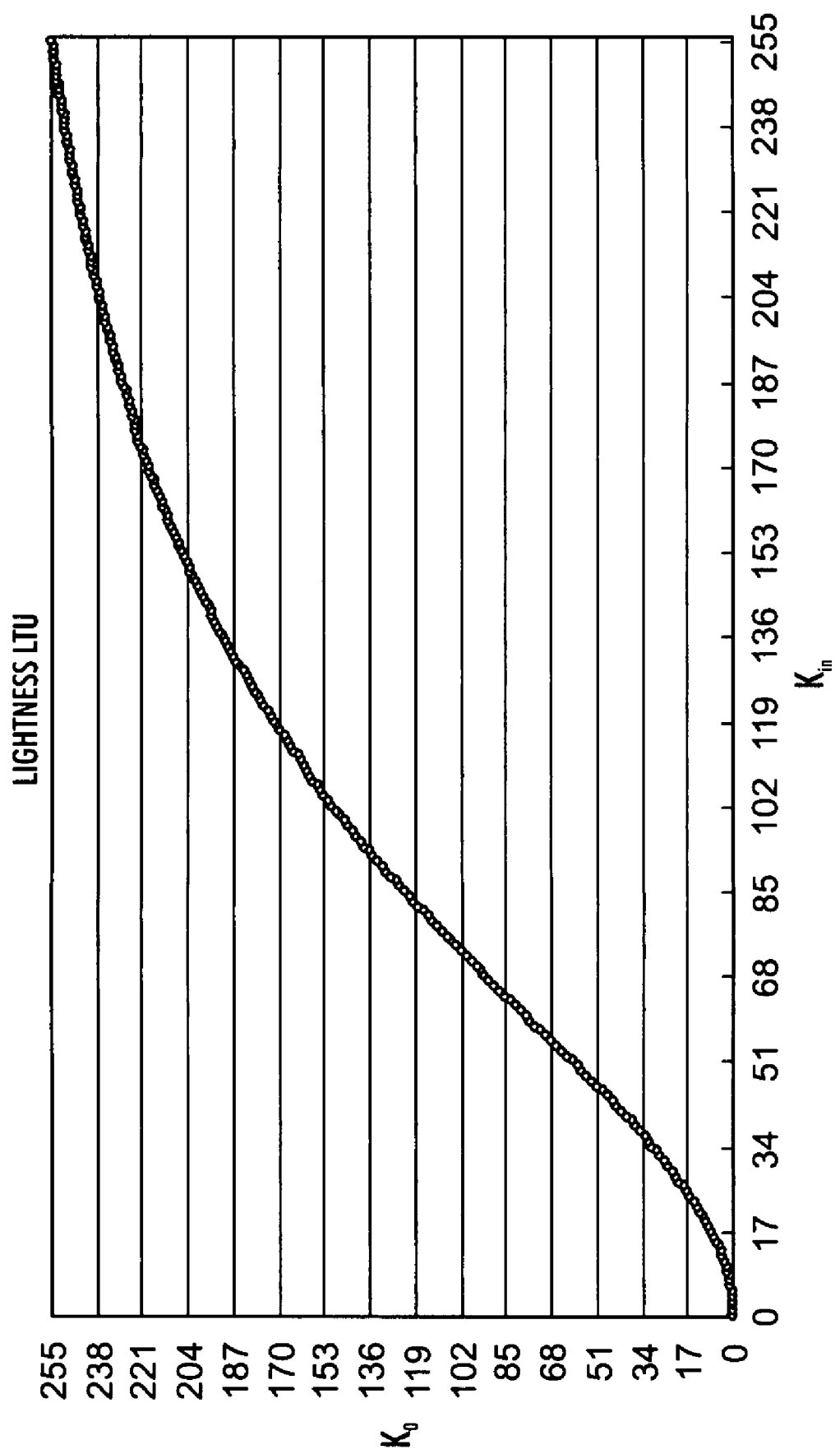
FIG. 2 is a graphical presentation of the values for determining $K_o$ from $K_{in}$ for the particular input image.

Referring to FIG. 1, the block flow diagram of the method or process of the present disclosure is indicated wherein color space coordinates for the print engine indicated at 0, 0, 0, $K_{in}$ are inputted to the lightness adjustment function 10 which is illustrated in FIG. 2 and Table I wherein for pixel values of $K_{in}$ for the input digital image, values of $K_o$ are determined.

TABLE I

| Kin | K0 |
|---|---|
| 0 | 0 |
| 1 | 0 |
| 2 | 0 |
| 3 | 0 |
| 4 | 0 |
| 5 | 0 |
| 6 | 1 |
| 7 | 1 |
| 8 | 1 |
| 9 | 2 |
| 10 | 2 |
| 11 | 3 |
| 12 | 4 |
| 13 | 4 |
| 14 | 5 |
| 15 | 6 |
| 16 | 7 |
| 17 | 8 |
| 18 | 9 |
| 19 | 10 |
| 20 | 11 |
| 21 | 12 |
| 22 | 13 |
| 23 | 14 |
| 24 | 16 |
| 25 | 17 |
| 26 | 18 |
| 27 | 20 |
| 28 | 21 |
| 29 | 22 |
| 30 | 24 |
| 31 | 25 |
| 32 | 27 |
| 33 | 28 |
| 34 | 30 |
| 35 | 32 |
| 36 | 33 |
| 37 | 35 |
| 38 | 37 |
| 39 | 38 |
| 40 | 40 |
| 41 | 42 |
| 42 | 44 |
| 43 | 45 |
| 44 | 47 |
| 45 | 49 |
| 46 | 51 |
| 47 | 53 |
| 48 | 55 |
| 49 | 57 |
| 50 | 58 |
| 51 | 60 |
| 52 | 62 |
| 53 | 64 |
| 54 | 66 |
| 55 | 68 |
| 56 | 70 |
| 57 | 72 |
| 58 | 74 |
| 59 | 76 |
| 60 | 77 |
| 61 | 79 |
| 62 | 81 |
| 63 | 83 |
| 64 | 85 |
| 65 | 87 |
| 66 | 89 |
| 67 | 91 |
| 68 | 93 |
| 69 | 94 |
| 70 | 96 |
| 71 | 98 |
| 72 | 100 |
| 73 | 102 |
| 74 | 104 |
| 75 | 106 |
| 76 | 107 |

TABLE I-continued

| Kin | K0 |
|---|---|
| 77 | 109 |
| 78 | 111 |
| 79 | 113 |
| 80 | 114 |
| 81 | 116 |
| 82 | 118 |
| 83 | 120 |
| 84 | 121 |
| 85 | 123 |
| 86 | 125 |
| 87 | 126 |
| 88 | 128 |
| 89 | 130 |
| 90 | 131 |
| 91 | 133 |
| 92 | 135 |
| 93 | 136 |
| 94 | 138 |
| 95 | 139 |
| 96 | 141 |
| 97 | 142 |
| 98 | 144 |
| 99 | 145 |
| 100 | 147 |
| 101 | 148 |
| 102 | 150 |
| 103 | 151 |
| 104 | 153 |
| 105 | 154 |
| 106 | 155 |
| 107 | 157 |
| 108 | 158 |
| 109 | 159 |
| 110 | 161 |
| 111 | 162 |
| 112 | 163 |
| 113 | 165 |
| 114 | 166 |
| 115 | 167 |
| 116 | 168 |
| 117 | 170 |
| 118 | 171 |
| 119 | 172 |
| 120 | 173 |
| 121 | 174 |
| 122 | 176 |
| 123 | 177 |
| 124 | 178 |
| 125 | 179 |
| 126 | 180 |
| 127 | 181 |
| 128 | 182 |
| 129 | 183 |
| 130 | 185 |
| 131 | 186 |
| 132 | 187 |
| 133 | 188 |
| 134 | 189 |
| 135 | 190 |
| 136 | 191 |
| 137 | 192 |
| 138 | 193 |
| 139 | 194 |
| 140 | 195 |
| 141 | 195 |
| 142 | 196 |
| 143 | 197 |
| 144 | 198 |
| 145 | 199 |
| 146 | 200 |
| 147 | 201 |
| 148 | 202 |
| 149 | 203 |
| 150 | 203 |
| 151 | 204 |
| 152 | 205 |
| 153 | 206 |

TABLE I-continued

| Kin | K0 |
|---|---|
| 154 | 207 |
| 155 | 207 |
| 156 | 208 |
| 157 | 209 |
| 158 | 210 |
| 159 | 211 |
| 160 | 211 |
| 161 | 212 |
| 162 | 213 |
| 163 | 213 |
| 164 | 214 |
| 165 | 215 |
| 166 | 216 |
| 167 | 216 |
| 168 | 217 |
| 169 | 218 |
| 170 | 218 |
| 171 | 219 |
| 172 | 220 |
| 173 | 220 |
| 174 | 221 |
| 175 | 222 |
| 176 | 222 |
| 177 | 223 |
| 178 | 223 |
| 179 | 224 |
| 180 | 225 |
| 181 | 225 |
| 182 | 226 |
| 183 | 226 |
| 184 | 227 |
| 185 | 227 |
| 186 | 228 |
| 187 | 229 |
| 188 | 229 |
| 189 | 230 |
| 190 | 230 |
| 191 | 231 |
| 192 | 231 |
| 193 | 232 |
| 194 | 232 |
| 195 | 233 |
| 196 | 233 |
| 197 | 234 |
| 198 | 234 |
| 199 | 235 |
| 200 | 235 |
| 201 | 236 |
| 202 | 236 |
| 203 | 237 |
| 204 | 237 |
| 205 | 237 |
| 206 | 238 |
| 207 | 238 |
| 208 | 239 |
| 209 | 239 |
| 210 | 240 |
| 211 | 240 |
| 212 | 240 |
| 213 | 241 |
| 214 | 241 |
| 215 | 242 |
| 216 | 242 |
| 217 | 242 |
| 218 | 243 |
| 219 | 243 |
| 220 | 244 |
| 221 | 244 |
| 222 | 244 |
| 223 | 245 |
| 224 | 245 |
| 225 | 245 |
| 226 | 246 |
| 227 | 246 |
| 228 | 247 |
| 229 | 247 |
| 230 | 247 |

TABLE I-continued

| Kin | K0 |
|---|---|
| 232 | 248 |
| 233 | 248 |
| 234 | 249 |
| 235 | 249 |
| 236 | 249 |
| 237 | 250 |
| 238 | 250 |
| 239 | 250 |
| 240 | 250 |
| 241 | 251 |
| 242 | 251 |
| 243 | 251 |
| 244 | 252 |
| 245 | 252 |
| 246 | 252 |
| 247 | 253 |
| 248 | 253 |
| 249 | 253 |
| 250 | 253 |
| 251 | 254 |
| 252 | 254 |
| 253 | 254 |
| 254 | 254 |
| 255 | 255 |

Figure 3:
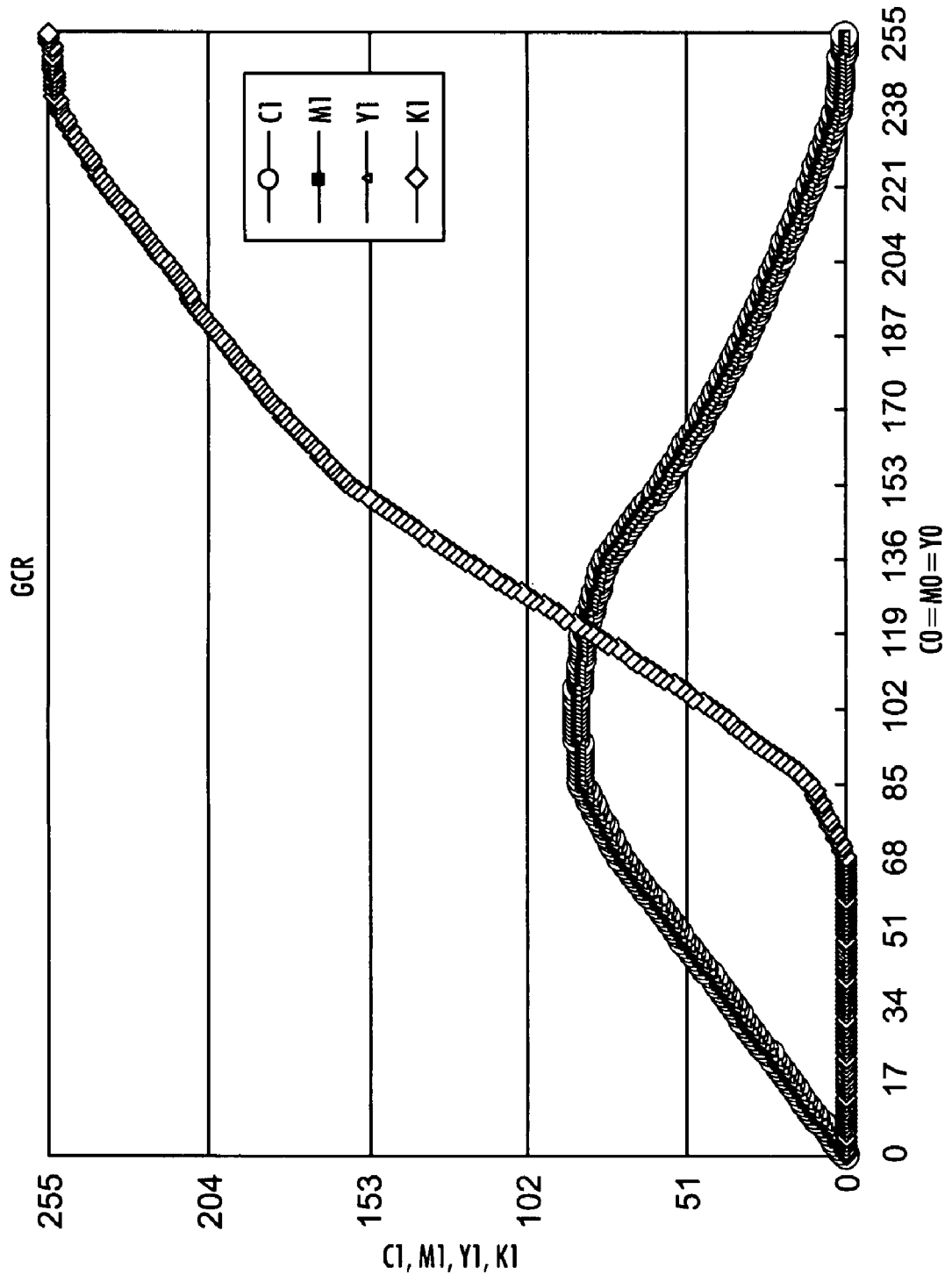
FIG. 3 is a graphical presentation of conversion from CMY color space to CMYK coordinate color space; and, FIG. 4 is a graphical presentation of values of the CMYK coordinates for gray balance adjustment to determine the output values to the print engine.

The system then proceeds to output the adjustment factor $K_o$ for the blackness for the particular input and inputs $K_o$ to step 14 for conversion to Cyan, Magenta, (CMY) color space coordinates. The conversion of step 14 is accomplished by obtaining values of $C_o = M_o = Y_o = K_o$ which values of $C_o$, $M_o$ and $Y_o$ are inputted to a Gray Component Replacement (GCR) strategy at step 16. The GCR at step 16 is accomplished by entering a graph such as FIG. 3 or Table II and obtaining values of CMYK denoted $C_1$, $M_1$, $Y_1$, $K_1$ in FIG. 1 which are then inputted to step 18 for gray balance adjustment.

TABLE II

| C | M | Y | K | CMYK ink cover (%) | MAX Ink |
|---|---|---|---|---|---|
| 0 | 0 | 0 | 0 | 0 | 138 |
| 1 | 1 | 1 | 1 | 0 | 1 |
| 2 | 2 | 2 | 2 | 0 | 2 |
| 3 | 3 | 3 | 3 | 0 | 3 |
| 4 | 4 | 4 | 4 | 0 | 4 |
| 5 | 5 | 5 | 5 | 0 | 5 |
| 6 | 6 | 6 | 6 | 0 | 7 |
| 7 | 7 | 7 | 7 | 0 | 8 |
| 8 | 9 | 9 | 9 | 0 | 10 |
| 9 | 10 | 10 | 10 | 0 | 11 |
| 10 | 11 | 11 | 11 | 0 | 12 |
| 11 | 12 | 12 | 12 | 0 | 14 |
| 12 | 13 | 13 | 13 | 0 | 15 |
| 13 | 14 | 14 | 14 | 0 | 16 |
| 14 | 15 | 15 | 15 | 0 | 17 |
| 15 | 16 | 16 | 16 | 0 | 18 |
| 16 | 17 | 17 | 17 | 0 | 20 |
| 17 | 18 | 18 | 18 | 0 | 21 |
| 18 | 19 | 19 | 19 | 0 | 22 |
| 19 | 20 | 20 | 20 | 0 | 23 |
| 20 | 21 | 21 | 21 | 0 | 24 |
| 22 | 22 | 22 | 22 | 0 | 25 |
| 22 | 23 | 23 | 23 | 0 | 27 |
| 23 | 24 | 24 | 24 | 0 | 28 |
| 24 | 26 | 26 | 26 | 0 | 30 |
| 25 | 27 | 27 | 27 | 0 | 31 |
| 26 | 28 | 28 | 28 | 0 | 32 |
| 27 | 29 | 29 | 29 | 0 | 34 |
| 28 | 30 | 30 | 30 | 0 | 35 |

TABLE II-continued

| C | M | Y | K | CMYK ink cover (%) | MAX Ink |
|---|---|---|---|---|---|
| 29 | 31 | 31 | 31 | 0 | 36 |
| 30 | 32 | 32 | 32 | 0 | 37 |
| 31 | 33 | 33 | 33 | 0 | 38 |
| 32 | 34 | 34 | 34 | 0 | 40 |
| 33 | 35 | 35 | 35 | 0 | 41 |
| 34 | 36 | 36 | 36 | 0 | 42 |
| 35 | 37 | 37 | 37 | 0 | 43 |
| 36 | 38 | 38 | 38 | 0 | 44 |
| 37 | 39 | 39 | 39 | 0 | 45 |
| 38 | 40 | 40 | 40 | 0 | 47 |
| 39 | 41 | 41 | 41 | 0 | 48 |
| 40 | 42 | 42 | 42 | 0 | 49 |
| 41 | 43 | 43 | 43 | 0 | 50 |
| 42 | 45 | 45 | 45 | 0 | 52 |
| 43 | 46 | 46 | 46 | 0 | 54 |
| 44 | 47 | 47 | 47 | 0 | 55 |
| 45 | 48 | 48 | 48 | 0 | 56 |
| 46 | 49 | 49 | 49 | 0 | 57 |
| 47 | 50 | 50 | 50 | 0 | 58 |
| 48 | 51 | 51 | 51 | 0 | 60 |
| 49 | 52 | 52 | 52 | 0 | 61 |
| 50 | 53 | 53 | 53 | 0 | 62 |
| 51 | 54 | 54 | 54 | 0 | 63 |
| 52 | 55 | 55 | 55 | 0 | 64 |
| 53 | 56 | 56 | 56 | 0 | 65 |
| 54 | 57 | 57 | 57 | 0 | 67 |
| 55 | 58 | 58 | 58 | 0 | 68 |
| 56 | 59 | 59 | 59 | 0 | 69 |
| 57 | 60 | 60 | 60 | 0 | 70 |
| 58 | 61 | 61 | 61 | 0 | 71 |
| 59 | 63 | 63 | 63 | 0 | 74 |
| 60 | 64 | 64 | 64 | 0 | 75 |
| 61 | 65 | 65 | 65 | 0 | 76 |
| 62 | 66 | 66 | 66 | 0 | 77 |
| 63 | 67 | 67 | 67 | 0 | 78 |
| 64 | 68 | 68 | 68 | 0 | 80 |
| 65 | 69 | 69 | 69 | 0 | 81 |
| 66 | 70 | 70 | 70 | 0 | 82 |
| 67 | 71 | 71 | 71 | 0 | 83 |
| 68 | 72 | 72 | 72 | 0 | 84 |
| 69 | 73 | 73 | 73 | 1 | 86 |
| 70 | 74 | 74 | 74 | 1 | 87 |
| 71 | 75 | 75 | 75 | 2 | 89 |
| 72 | 75 | 75 | 75 | 3 | 89 |
| 73 | 76 | 76 | 76 | 3 | 90 |
| 74 | 77 | 77 | 77 | 4 | 92 |
| 75 | 77 | 77 | 77 | 5 | 92 |
| 76 | 78 | 78 | 78 | 5 | 93 |
| 77 | 79 | 79 | 79 | 6 | 95 |
| 78 | 80 | 80 | 80 | 7 | 96 |
| 79 | 80 | 80 | 80 | 8 | 97 |
| 80 | 81 | 81 | 81 | 8 | 98 |
| 81 | 82 | 82 | 82 | 9 | 100 |
| 82 | 82 | 82 | 82 | 10 | 100 |
| 83 | 83 | 83 | 83 | 10 | 101 |
| 84 | 84 | 84 | 84 | 11 | 103 |
| 85 | 85 | 85 | 85 | 12 | 104 |
| 86 | 85 | 85 | 85 | 14 | 105 |
| 87 | 85 | 85 | 85 | 15 | 105 |
| 88 | 85 | 85 | 85 | 17 | 106 |
| 89 | 85 | 85 | 85 | 19 | 107 |
| 90 | 85 | 85 | 85 | 21 | 108 |
| 91 | 85 | 85 | 85 | 23 | 109 |
| 92 | 85 | 85 | 85 | 25 | 109 |
| 93 | 85 | 85 | 85 | 27 | 110 |
| 94 | 85 | 85 | 85 | 29 | 111 |
| 95 | 86 | 86 | 86 | 31 | 113 |
| 96 | 86 | 86 | 86 | 33 | 114 |
| 97 | 86 | 86 | 86 | 35 | 114 |
| 98 | 86 | 86 | 86 | 37 | 115 |
| 99 | 86 | 86 | 86 | 38 | 116 |
| 100 | 86 | 86 | 86 | 40 | 116 |
| 101 | 86 | 86 | 86 | 42 | 117 |
| 102 | 86 | 86 | 86 | 44 | 118 |

TABLE II-continued

| | C | M | Y | K | CMYK ink cover (%) | MAX Ink |
|---|---|---|---|---|---|---|
| 103 | 86 | 86 | 86 | 46 | 119 | |
| 104 | 86 | 86 | 86 | 49 | 120 | |
| 105 | 86 | 86 | 86 | 51 | 121 | |
| 106 | 86 | 86 | 86 | 53 | 121 | |
| 107 | 85 | 85 | 85 | 55 | 121 | |
| 108 | 85 | 85 | 85 | 58 | 122 | |
| 109 | 85 | 85 | 85 | 60 | 123 | |
| 110 | 85 | 85 | 85 | 62 | 124 | |
| 111 | 85 | 85 | 85 | 64 | 125 | |
| 112 | 85 | 85 | 85 | 67 | 126 | |
| 113 | 84 | 84 | 84 | 69 | 125 | |
| 114 | 84 | 84 | 84 | 71 | 126 | |
| 115 | 84 | 84 | 84 | 73 | 127 | |
| 116 | 84 | 84 | 84 | 76 | 128 | |
| 117 | 84 | 84 | 84 | 78 | 129 | |
| 118 | 84 | 84 | 84 | 80 | 130 | |
| 119 | 83 | 83 | 83 | 82 | 129 | |
| 120 | 83 | 83 | 83 | 85 | 130 | |
| 121 | 83 | 83 | 83 | 87 | 131 | |
| 122 | 82 | 82 | 82 | 90 | 131 | |
| 123 | 82 | 82 | 82 | 92 | 132 | |
| 124 | 81 | 81 | 81 | 95 | 132 | |
| 125 | 81 | 81 | 81 | 97 | 133 | |
| 126 | 81 | 81 | 81 | 100 | 134 | |
| 127 | 80 | 80 | 80 | 102 | 134 | |
| 128 | 80 | 80 | 80 | 104 | 134 | |
| 129 | 79 | 79 | 79 | 107 | 134 | |
| 130 | 79 | 79 | 79 | 109 | 135 | |
| 131 | 79 | 79 | 79 | 112 | 136 | |
| 132 | 78 | 78 | 78 | 114 | 136 | |
| 133 | 78 | 78 | 78 | 117 | 137 | |
| 134 | 77 | 77 | 77 | 119 | 137 | |
| 135 | 77 | 77 | 77 | 122 | 138 | |
| 136 | 76 | 76 | 76 | 124 | 138 | |
| 137 | 75 | 75 | 75 | 126 | 137 | |
| 138 | 74 | 74 | 74 | 128 | 137 | |
| 139 | 73 | 73 | 73 | 130 | 136 | |
| 140 | 72 | 72 | 72 | 132 | 136 | |
| 141 | 71 | 71 | 71 | 135 | 136 | |
| 142 | 70 | 70 | 70 | 137 | 136 | |
| 143 | 69 | 69 | 69 | 139 | 135 | |
| 144 | 68 | 68 | 68 | 141 | 135 | |
| 145 | 67 | 67 | 67 | 143 | 134 | |
| 146 | 66 | 66 | 66 | 145 | 134 | |
| 147 | 65 | 65 | 65 | 147 | 134 | |
| 148 | 64 | 64 | 64 | 149 | 133 | |
| 149 | 63 | 63 | 63 | 151 | 133 | |
| 150 | 61 | 61 | 61 | 153 | 131 | |
| 151 | 60 | 60 | 60 | 156 | 131 | |
| 152 | 59 | 59 | 59 | 158 | 131 | |
| 153 | 58 | 58 | 58 | 160 | 130 | |
| 154 | 57 | 57 | 57 | 161 | 130 | |
| 155 | 57 | 57 | 57 | 162 | 130 | |
| 156 | 56 | 56 | 56 | 164 | 130 | |
| 157 | 55 | 55 | 55 | 165 | 129 | |
| 158 | 54 | 54 | 54 | 166 | 128 | |
| 159 | 53 | 53 | 53 | 168 | 128 | |
| 160 | 52 | 52 | 52 | 169 | 127 | |
| 161 | 51 | 51 | 51 | 170 | 126 | |
| 162 | 51 | 51 | 51 | 172 | 127 | |
| 163 | 50 | 50 | 50 | 173 | 126 | |
| 164 | 49 | 49 | 49 | 174 | 125 | |
| 165 | 48 | 48 | 48 | 176 | 125 | |
| 166 | 47 | 47 | 47 | 177 | 124 | |
| 167 | 46 | 46 | 46 | 178 | 123 | |
| 168 | 46 | 46 | 46 | 180 | 124 | |
| 169 | 45 | 45 | 45 | 181 | 123 | |
| 170 | 44 | 44 | 44 | 182 | 123 | |
| 171 | 43 | 43 | 43 | 184 | 122 | |
| 172 | 42 | 42 | 42 | 185 | 121 | |
| 173 | 42 | 42 | 42 | 186 | 122 | |
| 174 | 41 | 41 | 41 | 187 | 121 | |
| 175 | 40 | 40 | 40 | 188 | 120 | |
| 176 | 39 | 39 | 39 | 189 | 120 | |
| 177 | 39 | 39 | 39 | 190 | 120 | |
| 178 | 38 | 38 | 38 | 191 | 119 | |
| 179 | 37 | 37 | 37 | 193 | 119 | |
| 180 | 36 | 36 | 36 | 194 | 118 | |
| 181 | 36 | 36 | 36 | 195 | 118 | |
| 182 | 35 | 35 | 35 | 196 | 118 | |
| 183 | 34 | 34 | 34 | 197 | 117 | |
| 184 | 34 | 34 | 34 | 198 | 117 | |
| 185 | 33 | 33 | 33 | 199 | 116 | |
| 186 | 32 | 32 | 32 | 200 | 116 | |
| 187 | 31 | 31 | 31 | 202 | 115 | |
| 188 | 31 | 31 | 31 | 203 | 116 | |
| 189 | 30 | 30 | 30 | 204 | 115 | |
| 190 | 30 | 30 | 30 | 205 | 115 | |
| 191 | 29 | 29 | 29 | 206 | 114 | |
| 192 | 28 | 28 | 28 | 207 | 114 | |
| 193 | 28 | 28 | 28 | 208 | 114 | |
| 194 | 27 | 27 | 27 | 209 | 113 | |
| 195 | 26 | 26 | 26 | 210 | 112 | |
| 196 | 26 | 26 | 26 | 210 | 112 | |
| 197 | 25 | 25 | 25 | 211 | 112 | |
| 198 | 25 | 25 | 25 | 212 | 112 | |
| 199 | 24 | 24 | 24 | 213 | 111 | |
| 200 | 23 | 23 | 23 | 214 | 110 | |
| 201 | 23 | 23 | 23 | 215 | 111 | |
| 202 | 22 | 22 | 22 | 216 | 110 | |
| 203 | 22 | 22 | 22 | 217 | 110 | |
| 204 | 21 | 21 | 21 | 218 | 110 | |
| 205 | 20 | 20 | 20 | 220 | 109 | |
| 206 | 20 | 20 | 20 | 221 | 110 | |
| 207 | 19 | 19 | 19 | 222 | 109 | |
| 208 | 19 | 19 | 19 | 223 | 109 | |
| 209 | 18 | 18 | 18 | 224 | 109 | |
| 210 | 17 | 17 | 17 | 225 | 108 | |
| 211 | 17 | 17 | 17 | 226 | 108 | |
| 212 | 16 | 16 | 16 | 227 | 107 | |
| 213 | 16 | 16 | 16 | 228 | 108 | |
| 214 | 15 | 15 | 15 | 229 | 107 | |
| 215 | 14 | 14 | 14 | 230 | 106 | |
| 216 | 14 | 14 | 14 | 232 | 107 | |
| 217 | 13 | 13 | 13 | 233 | 106 | |
| 218 | 13 | 13 | 13 | 234 | 107 | |
| 219 | 12 | 12 | 12 | 235 | 106 | |
| 220 | 11 | 11 | 11 | 236 | 105 | |
| 221 | 11 | 11 | 11 | 237 | 105 | |
| 222 | 10 | 10 | 10 | 238 | 105 | |
| 223 | 10 | 10 | 10 | 239 | 105 | |
| 224 | 9 | 9 | 9 | 240 | 104 | |
| 225 | 9 | 9 | 9 | 241 | 105 | |
| 226 | 8 | 8 | 8 | 241 | 103 | |
| 227 | 8 | 8 | 8 | 242 | 104 | |
| 228 | 7 | 7 | 7 | 243 | 103 | |
| 229 | 7 | 7 | 7 | 244 | 103 | |
| 230 | 6 | 6 | 6 | 245 | 103 | |
| 231 | 6 | 6 | 6 | 246 | 103 | |
| 232 | 5 | 5 | 5 | 247 | 102 | |
| 233 | 5 | 5 | 5 | 248 | 103 | |
| 234 | 4 | 4 | 4 | 249 | 102 | |
| 235 | 4 | 4 | 4 | 249 | 102 | |
| 236 | 3 | 3 | 3 | 250 | 101 | |
| 237 | 3 | 3 | 3 | 251 | 101 | |
| 238 | 2 | 2 | 2 | 252 | 101 | |
| 239 | 2 | 2 | 2 | 252 | 101 | |
| 240 | 2 | 2 | 2 | 252 | 101 | |
| 241 | 2 | 2 | 2 | 253 | 101 | |
| 242 | 2 | 2 | 2 | 253 | 101 | |
| 243 | 1 | 1 | 1 | 253 | 100 | |
| 244 | 1 | 1 | 1 | 253 | 100 | |
| 245 | 1 | 1 | 1 | 253 | 100 | |
| 246 | 1 | 1 | 1 | 253 | 100 | |
| 247 | 1 | 1 | 1 | 253 | 100 | |
| 248 | 1 | 1 | 1 | 254 | 100 | |
| 249 | 1 | 1 | 1 | 254 | 100 | |
| 250 | 1 | 1 | 1 | 254 | 100 | |

TABLE II-continued

| | C | M | Y | K | CMYK ink cover (%) | MAX Ink |
|---|---|---|---|---|---|---|
| 251 | 0 | 0 | 0 | 254 | 99 | |
| 252 | 0 | 0 | 0 | 254 | 99 | |
| 253 | 0 | 0 | 0 | 255 | 100 | |
| 254 | 0 | 0 | 0 | 255 | 100 | |
| 255 | 0 | 0 | 0 | 255 | 100 | |

Figure 4:
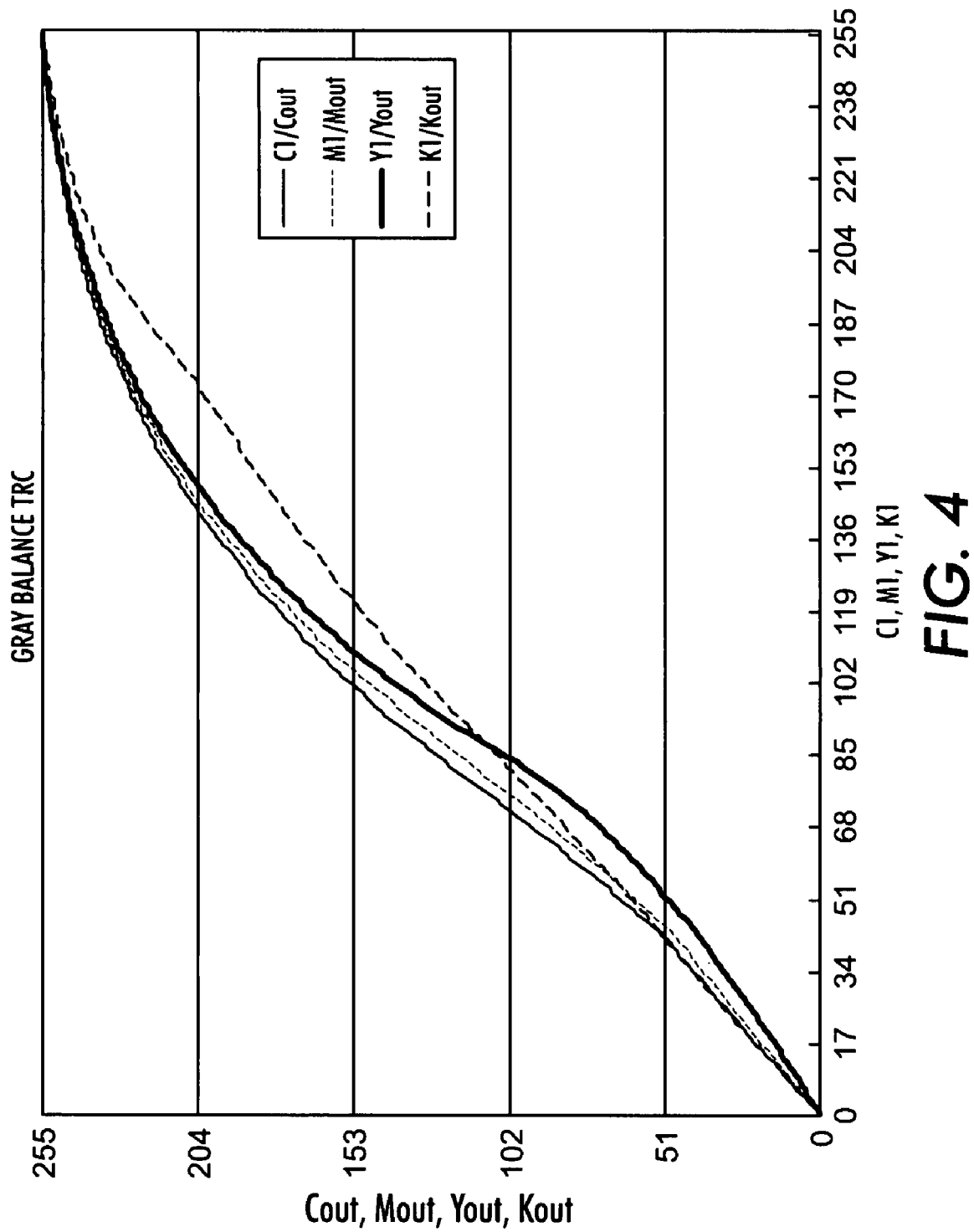

Referring to FIG. 4 and Table III, for the input values of $C_1$, $M_1$, $Y_1$, $K_1$ the output values $C_{out}$, $M_{out}$, $Y_{out}$, $K_{out}$ are obtained in the graph or table and these values of color space coordinates inputted to the print engine as, for example, to a raster image processor.

TABLE III

| | C | M | Y | K |
|---|---|---|---|---|
| 0 | 0 | 0 | 0 | 0 |
| 1 | 1 | 1 | 1 | 1 |
| 2 | 3 | 3 | 2 | 3 |
| 3 | 4 | 4 | 3 | 4 |
| 4 | 5 | 5 | 4 | 5 |
| 5 | 7 | 6 | 5 | 6 |
| 6 | 8 | 7 | 5 | 8 |
| 7 | 9 | 8 | 6 | 9 |
| 8 | 11 | 10 | 7 | 10 |
| 9 | 12 | 11 | 8 | 11 |
| 10 | 13 | 12 | 9 | 13 |
| 11 | 14 | 13 | 10 | 14 |
| 12 | 15 | 14 | 11 | 15 |
| 13 | 17 | 15 | 12 | 17 |
| 14 | 18 | 16 | 13 | 18 |
| 15 | 19 | 17 | 13 | 19 |
| 16 | 21 | 19 | 14 | 20 |
| 17 | 22 | 20 | 15 | 22 |
| 18 | 23 | 21 | 16 | 23 |
| 19 | 24 | 22 | 17 | 24 |
| 20 | 25 | 23 | 18 | 25 |
| 21 | 26 | 24 | 19 | 27 |
| 22 | 27 | 25 | 20 | 28 |
| 23 | 29 | 27 | 21 | 29 |
| 24 | 30 | 28 | 22 | 31 |
| 25 | 31 | 29 | 23 | 32 |
| 26 | 33 | 30 | 24 | 33 |
| 27 | 34 | 31 | 25 | 34 |
| 28 | 35 | 32 | 26 | 35 |
| 29 | 36 | 33 | 27 | 37 |
| 30 | 37 | 34 | 28 | 38 |
| 31 | 38 | 35 | 29 | 39 |
| 32 | 39 | 36 | 30 | 40 |
| 33 | 41 | 38 | 31 | 41 |
| 34 | 42 | 39 | 32 | 42 |
| 35 | 43 | 40 | 33 | 43 |
| 36 | 44 | 41 | 34 | 45 |
| 37 | 46 | 42 | 35 | 46 |
| 38 | 47 | 43 | 36 | 47 |
| 39 | 48 | 44 | 37 | 48 |
| 40 | 50 | 46 | 38 | 49 |
| 41 | 51 | 47 | 39 | 50 |
| 42 | 52 | 48 | 40 | 51 |
| 43 | 53 | 49 | 41 | 53 |
| 44 | 55 | 51 | 42 | 54 |
| 45 | 56 | 52 | 43 | 55 |
| 46 | 58 | 54 | 44 | 56 |
| 47 | 60 | 55 | 46 | 57 |
| 48 | 61 | 57 | 47 | 59 |
| 49 | 63 | 58 | 48 | 60 |
| 50 | 65 | 60 | 49 | 61 |
| 51 | 66 | 61 | 51 | 62 |
| 52 | 68 | 63 | 52 | 64 |
| 53 | 69 | 64 | 53 | 65 |
| 54 | 71 | 66 | 54 | 66 |

TABLE III-continued

| | C | M | Y | K |
|---|---|---|---|---|
| 55 | 73 | 68 | 55 | 67 |
| 56 | 74 | 69 | 57 | 69 |
| 57 | 76 | 71 | 58 | 70 |
| 58 | 78 | 72 | 59 | 71 |
| 59 | 80 | 74 | 60 | 73 |
| 60 | 82 | 76 | 62 | 74 |
| 61 | 83 | 77 | 63 | 75 |
| 62 | 85 | 79 | 64 | 76 |
| 63 | 86 | 80 | 66 | 78 |
| 64 | 88 | 82 | 67 | 79 |
| 65 | 90 | 84 | 68 | 80 |
| 66 | 92 | 86 | 70 | 82 |
| 67 | 94 | 87 | 71 | 83 |
| 68 | 96 | 89 | 73 | 84 |
| 69 | 98 | 91 | 74 | 85 |
| 70 | 100 | 93 | 76 | 87 |
| 71 | 101 | 94 | 77 | 88 |
| 72 | 103 | 96 | 79 | 89 |
| 73 | 105 | 98 | 81 | 91 |
| 74 | 106 | 99 | 82 | 92 |
| 75 | 108 | 101 | 84 | 93 |
| 76 | 110 | 103 | 86 | 95 |
| 77 | 112 | 105 | 88 | 96 |
| 78 | 114 | 107 | 90 | 97 |
| 79 | 116 | 109 | 92 | 99 |
| 80 | 118 | 111 | 94 | 100 |
| 81 | 120 | 112 | 96 | 101 |
| 82 | 122 | 114 | 98 | 103 |
| 83 | 123 | 116 | 100 | 104 |
| 84 | 125 | 118 | 103 | 105 |
| 85 | 127 | 120 | 105 | 107 |
| 86 | 129 | 122 | 107 | 108 |
| 87 | 130 | 123 | 110 | 109 |
| 88 | 132 | 125 | 112 | 111 |
| 89 | 134 | 127 | 114 | 112 |
| 90 | 135 | 128 | 116 | 114 |
| 91 | 137 | 130 | 119 | 115 |
| 92 | 139 | 132 | 121 | 116 |
| 93 | 141 | 134 | 123 | 118 |
| 94 | 143 | 136 | 125 | 119 |
| 95 | 144 | 137 | 127 | 121 |
| 96 | 146 | 139 | 129 | 122 |
| 97 | 147 | 140 | 131 | 123 |
| 98 | 149 | 142 | 133 | 125 |
| 99 | 150 | 144 | 135 | 126 |
| 100 | 152 | 146 | 137 | 128 |
| 101 | 153 | 147 | 139 | 129 |
| 102 | 155 | 149 | 141 | 130 |
| 103 | 157 | 151 | 143 | 132 |
| 104 | 158 | 152 | 144 | 133 |
| 105 | 160 | 154 | 146 | 134 |
| 106 | 161 | 155 | 148 | 136 |
| 107 | 162 | 157 | 150 | 137 |
| 108 | 164 | 159 | 151 | 138 |
| 109 | 165 | 160 | 153 | 139 |
| 110 | 166 | 161 | 155 | 141 |
| 111 | 168 | 163 | 156 | 142 |
| 112 | 170 | 165 | 158 | 143 |
| 113 | 171 | 166 | 159 | 144 |
| 114 | 172 | 167 | 161 | 145 |
| 115 | 173 | 169 | 163 | 146 |
| 116 | 175 | 170 | 164 | 148 |
| 117 | 176 | 172 | 166 | 149 |
| 118 | 177 | 173 | 167 | 150 |
| 119 | 178 | 174 | 169 | 151 |
| 120 | 179 | 175 | 170 | 152 |
| 121 | 181 | 177 | 171 | 153 |
| 122 | 182 | 178 | 173 | 154 |
| 123 | 184 | 180 | 174 | 155 |
| 124 | 185 | 181 | 176 | 157 |
| 125 | 186 | 182 | 177 | 158 |
| 126 | 187 | 183 | 178 | 159 |
| 127 | 188 | 185 | 180 | 160 |
| 128 | 189 | 186 | 181 | 161 |
| 129 | 190 | 187 | 182 | 162 |
| 130 | 191 | 188 | 184 | 163 |
| 131 | 192 | 189 | 185 | 164 |

TABLE III-continued

| | C | M | Y | K |
|---|---|---|---|---|
| 132 | 193 | 190 | 186 | 165 |
| 133 | 194 | 191 | 187 | 166 |
| 134 | 196 | 193 | 189 | 167 |
| 135 | 197 | 194 | 190 | 169 |
| 136 | 198 | 195 | 191 | 170 |
| 137 | 199 | 196 | 192 | 171 |
| 138 | 200 | 197 | 193 | 172 |
| 139 | 201 | 198 | 195 | 173 |
| 140 | 202 | 199 | 196 | 174 |
| 141 | 203 | 200 | 197 | 175 |
| 142 | 204 | 202 | 198 | 176 |
| 143 | 205 | 203 | 199 | 177 |
| 144 | 206 | 204 | 200 | 178 |
| 145 | 207 | 205 | 201 | 179 |
| 146 | 208 | 206 | 202 | 180 |
| 147 | 209 | 207 | 203 | 181 |
| 148 | 210 | 208 | 204 | 182 |
| 149 | 210 | 208 | 205 | 183 |
| 150 | 211 | 209 | 206 | 184 |
| 151 | 212 | 210 | 207 | 185 |
| 152 | 213 | 211 | 208 | 186 |
| 153 | 214 | 212 | 209 | 187 |
| 154 | 215 | 213 | 210 | 188 |
| 155 | 216 | 214 | 211 | 189 |
| 156 | 217 | 215 | 212 | 190 |
| 157 | 218 | 216 | 213 | 191 |
| 158 | 218 | 216 | 214 | 191 |
| 159 | 219 | 217 | 215 | 192 |
| 160 | 220 | 218 | 216 | 193 |
| 161 | 220 | 218 | 217 | 194 |
| 162 | 221 | 219 | 217 | 195 |
| 163 | 222 | 220 | 218 | 196 |
| 164 | 222 | 221 | 219 | 197 |
| 165 | 223 | 222 | 220 | 198 |
| 166 | 224 | 223 | 220 | 199 |
| 167 | 224 | 223 | 221 | 200 |
| 168 | 225 | 224 | 222 | 201 |
| 169 | 226 | 225 | 223 | 202 |
| 170 | 226 | 225 | 223 | 203 |
| 171 | 227 | 226 | 224 | 204 |
| 172 | 227 | 226 | 225 | 204 |
| 173 | 228 | 227 | 225 | 205 |
| 174 | 229 | 228 | 226 | 207 |
| 175 | 229 | 228 | 227 | 208 |
| 176 | 230 | 229 | 227 | 209 |
| 177 | 230 | 229 | 228 | 210 |
| 178 | 231 | 230 | 229 | 211 |
| 179 | 232 | 231 | 229 | 212 |
| 180 | 232 | 231 | 230 | 213 |
| 181 | 233 | 232 | 231 | 214 |
| 182 | 234 | 233 | 231 | 215 |
| 183 | 234 | 233 | 232 | 217 |
| 184 | 235 | 234 | 232 | 218 |
| 185 | 235 | 234 | 233 | 219 |
| 186 | 236 | 235 | 233 | 220 |
| 187 | 236 | 235 | 234 | 221 |
| 188 | 237 | 236 | 234 | 222 |
| 189 | 237 | 236 | 235 | 223 |
| 190 | 238 | 237 | 236 | 224 |
| 191 | 238 | 237 | 236 | 225 |
| 192 | 239 | 238 | 237 | 226 |
| 193 | 239 | 238 | 237 | 227 |
| 194 | 240 | 239 | 238 | 228 |
| 195 | 240 | 239 | 238 | 229 |
| 196 | 240 | 239 | 238 | 230 |
| 197 | 241 | 240 | 239 | 231 |
| 198 | 241 | 240 | 239 | 232 |
| 199 | 242 | 241 | 240 | 233 |
| 200 | 242 | 241 | 240 | 233 |
| 201 | 242 | 241 | 241 | 234 |
| 202 | 243 | 242 | 241 | 235 |
| 203 | 243 | 242 | 242 | 236 |
| 204 | 244 | 243 | 242 | 236 |
| 205 | 244 | 243 | 242 | 237 |
| 206 | 244 | 244 | 243 | 238 |
| 207 | 245 | 244 | 243 | 238 |
| 208 | 245 | 244 | 244 | 239 |
| 209 | 245 | 245 | 244 | 239 |
| 210 | 246 | 245 | 244 | 240 |
| 211 | 246 | 246 | 245 | 241 |
| 212 | 246 | 246 | 245 | 241 |
| 213 | 247 | 246 | 246 | 242 |
| 214 | 247 | 247 | 246 | 242 |
| 215 | 247 | 247 | 246 | 243 |
| 216 | 247 | 247 | 247 | 243 |
| 217 | 248 | 248 | 247 | 244 |
| 218 | 248 | 248 | 247 | 244 |
| 219 | 248 | 248 | 248 | 245 |
| 220 | 249 | 249 | 248 | 245 |
| 221 | 249 | 249 | 248 | 245 |
| 222 | 249 | 249 | 248 | 246 |
| 223 | 249 | 249 | 249 | 246 |
| 224 | 250 | 250 | 249 | 247 |
| 225 | 250 | 250 | 249 | 247 |
| 226 | 250 | 250 | 250 | 247 |
| 227 | 250 | 250 | 250 | 248 |
| 228 | 251 | 251 | 250 | 248 |
| 229 | 251 | 251 | 250 | 248 |
| 230 | 251 | 251 | 251 | 249 |
| 231 | 251 | 251 | 251 | 249 |
| 232 | 252 | 252 | 251 | 249 |
| 233 | 252 | 252 | 251 | 250 |
| 234 | 252 | 252 | 252 | 250 |
| 235 | 252 | 252 | 252 | 250 |
| 236 | 252 | 252 | 252 | 251 |
| 237 | 253 | 253 | 252 | 251 |
| 238 | 253 | 253 | 252 | 251 |
| 239 | 253 | 253 | 253 | 251 |
| 240 | 253 | 253 | 253 | 252 |
| 241 | 253 | 253 | 253 | 252 |
| 242 | 253 | 253 | 253 | 252 |
| 243 | 254 | 254 | 253 | 252 |
| 244 | 254 | 254 | 254 | 253 |
| 245 | 254 | 254 | 254 | 253 |
| 246 | 254 | 254 | 254 | 253 |
| 247 | 254 | 254 | 254 | 253 |
| 248 | 254 | 254 | 254 | 254 |
| 249 | 254 | 254 | 254 | 254 |
| 250 | 255 | 255 | 254 | 254 |
| 251 | 255 | 255 | 255 | 254 |
| 252 | 255 | 255 | 255 | 254 |
| 253 | 255 | 255 | 255 | 255 |
| 254 | 255 | 255 | 255 | 255 |
| 255 | 255 | 255 | 255 | 255 |

The system may also include a user input command for disabling the operations of steps 12, 14, 16 and 18 and printing the image monochromatically with black ink or black toner.

The system 10 may also have provision for user inputting or selecting different parameters for any one of the steps 12, 16, 18 such as different marking resolution, color mode or service type e.g. print or copy job.

The gray component replacement at step 16 may also employ a strategy of no black ink/toner in highlight area, (i.e., CMY ink/toner only in highlight) and delaying the use of black ink/toner as late as possible, for example, until mid-tone is reached.

The gray component replacement at step 16 may also employ a strategy of limiting total CMYK ink coverage.

Although the method of the present disclosure has been described for clarity with respect to the use of separate lookup tables (LUT) I, II and III for Lightness adjustment, GCR and Gray Balance adjustment, it will be understood that digitally electronically these tables may be combined into a single look-up table.

The present disclosure thus describes a unique method for converting monochromatic black printing to composite black in a color print engine to provide improved quality of the black print job.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of converting black to composite black in digital print comprising:
   (a) providing a digital color print engine;
   (b) using the color print engine for establishing a lightness adjustment factor $K_o$ from black $(0, 0, 0 K_{in})$ for the input image;
   (c) using the print engine for setting initial values of cyan ($C_o$), magenta ($M_o$), and yellow ($Y_o$) equal to $K_o$;
   (d) using the print engine for converting $C_o$, $M_o$, $Y_o$ to values of $C_1$, $M_1$, $Y_1$, $K_1$ by GCR strategy;
   (e) using the print engine for determining corresponding values of Gray Balance Adjustment $C_{out}$, $M_{out}$, $Y_{out}$, $K_{out}$ for values of $C_i$, $M_1$, $Y_1$, $K_1$; and,
   (f) inputting the values of $C_{out}$, $M_{out}$, $Y_{out}$, $K_{out}$ to the digital color print engine.

2. The method defined in claim 1, wherein the step of establishing a lightness adjustment includes determining $K_o$ from a look-up table of values of black ($K_{in}$) versus $K_o$.

3. The method defined in claim 1, further comprising limiting the ink coverage in the step of converting by GCR strategy.

4. The method of converting black to composite black in digital printing defined in claim 1, wherein the step of converting by GCR strategy includes delaying the output of $K_1$ until mid-tone.

5. The method defined in claim 1, wherein the step of determining Gray Balance Adjustment includes obtaining values of $C_{out}$, $M_{out}$, $Y_{out}$, $K_{out}$ from a look-up table.

6. The method defined in claim 1, wherein the step of converting Co, Mo, Yo to values of $C_1$, $M_1$, $Y_1$, $K_1$, includes obtaining values of $C_1$, $M_1$, $Y_1$, $K_1$ from a look-up table.

7. The method defined in claim 1, further comprising providing for user selection of $K_{in}$=255 for printing in black ink/toner only.

8. The method defined in claim 1, further comprising user inputting different parameters for one of Lightness Adjustment, GCR Strategy and Gray Balance Adjustment based upon one of marking resolution, color mode, service type.

* * * * *